United States Patent [19]

Okuda et al.

[11] Patent Number: 5,667,570

[45] Date of Patent: Sep. 16, 1997

[54] EMULSION INK FOR STENCIL PRINTING

[75] Inventors: Sadanao Okuda; Yoshihiro Hayashi, both of Amimachi, Japan

[73] Assignee: Riso Kagaku Corporation, Tokyo, Japan

[21] Appl. No.: 640,192

[22] Filed: Apr. 30, 1996

[30] Foreign Application Priority Data

May 1, 1995 [JP] Japan ................................. 7-107608

[51] Int. Cl.$^6$ ............................ C09D 11/02; C09D 11/08
[52] U.S. Cl. ................................. 106/31.26; 106/31.9
[58] Field of Search ........................... 106/20 R, 27 R, 106/30 R, 32

[56] References Cited

U.S. PATENT DOCUMENTS 5,389,130 2/1995 Batlaw et al. ..................... 106/20 R
5,429,841 7/1995 Batlaw et al. ..................... 106/23 D Primary Examiner—Helene Klemanski
Attorney, Agent, or Firm—Fay, Sharpe, Beall, Fagan, Minnich & McKee

[57] ABSTRACT

An emulsion ink for stencil printing is provided, which affords a printed image having a high density and a constant quality, without being influenced by kinds of printing paper used, and by the presence or absence of projections and depressions on the surface of printing paper used, has a superior drying property of ink and does not cause any exudation, seeping-through and offsetting, which emulsion ink for stencil printing comprises an oil phase and an aqueous phase to form a Water-in-oil(W/O) type emulsion ink, wherein a extender pigment is contained in the oil phase of the emulsion ink.

10 Claims, No Drawings 5,667,570

EMULSION INK FOR STENCIL PRINTING

BACKGROUND OF THE INVENTION

1. Field of Commercial Utilization

This invention relates to an emulsion ink for stencil printing. More particularly, it relates to an emulsion ink for stencil printing, which affords a printed image having a high density and a constant quality, without being influenced by the kinds of printing paper and the presence or absence of projections and depressions on the surface of printing paper, and has a superior ink-drying property and no exudation, seeping-through and offsetting of ink.

2. Description of the Related Art

Stencil printing is conducted by using stencil sheet, feeding an ink through the perforated parts formed on the sheet, to carry out printing on the body to be printed, such as paper; hence the stencil printing has been utilized in broad fields due to the easy stencil-making.

As the ink used for stencil printing, water-in-oil(W/O) type emulsion ink has been generally used. The drying of this emulsion ink is carried out by impregnating the ink component into the inside of the printing paper as the body to be printed and at the same time, scattering water component into the air (see Japanese patent application laid-open Nos. Sho 61-255967, Sho 64-14284, Hei 4-132777, Hei 5-117565, etc.).

However, in the case of conventional W/O type emulsion ink which contains a coloring agent, the ink component is impregnated into the inside of the printing paper at the time of ink drying, and at the same time, the coloring agent, too, is impregnated into the inside of the printing paper; hence there have been raised problems that the quantity of the coloring agent remaining on the surface of the paper is reduced and the printing density is reduced. Further, since the coloring agent in the ink is impregnated into the inside of the printing paper, a phenomenon is liable to occur that a printing image as a counter image is seen from the back surface of the printing paper, that is, the so-called ink seeping-through phenomenon.

Further, the impregnation speed of the ink component into the inside of the paper varies depending upon the kinds of the paper used; hence there occurs a drawback that the density of printed image, and the exudation of ink, seeping-through and offsetting of ink resulting from the different kinds of used paper vary depending upon the kinds of the paper used. Namely, when a paper to be printed has a rapid impregnation speed of ink, the ink component almost dose not remain on the surface of the paper, but it is impregnated into the inside of the paper; hence the printing density of the printed image lowers and the seeping-through of ink increases, and as the ink component does not remain on the surface of the paper, the offsetting decreases. Whereas, when a paper to be printed has a low impregnation speed, the ink components is liable to remain on the surface of the paper; hence the printing density of the printed image becomes high and the seeping-through is decreased, but the ink component remains in a large quantity on the surface of the paper; hence the offsetting of the ink increases. Accordingly, there has been desired an emulsion for stencil printing that a printing image having a high density is obtained without being influenced by the impregnation speed of the ink into the printing paper used, and at the same time, does not cause any seeping-through and offsetting of the ink.

Further, the drying of the emulsion ink is carried out by impregnating the ink into the inside of the paper, hence if stencil printing is carried out by using a printing paper having projections and depressions on the surface of the paper, it is difficult to obtain a printing image of gloss tone, depending upon the kind of paper. Such a phenomenon is observed even in the cases of high quality paper or intermediate quality paper, and it is notable particularly in the case of low quality paper. Thus, the quality of the resulting printing image varies depending upon the presence or absence of the projections and depressions on the surface of the used paper, and such a phenomenon notably appears when full color printing is carried out.

Further, in the case of stencil printing, since the ink is extruded through the perforated parts of the stencil sheet and fed to the printing paper, a certain extent of viscosity should be imparted to the ink. However, if the viscosity is imparted by containing a high molecular weight compound such as resins, in the oil phase component, the impregnation speed of the ink is lowered and the offsetting is liable to occur.

The present inventions have proposed a W/O type emulsion ink for stencil printing having a extender pigment contained in an aqueous phase, thereby affording a good printed image, without being influenced by the impregnation speed of the ink into the printing paper (see Japanese patent application No. Hei 7-24373). However, the following fact has been found: when the emulsion ink is impregnated into the printing paper used, impregnation of the aqueous phase occurs after impregnation of the oil phase; hence the impregnation speed of the emulsion ink is most influenced by the oil phase component; thus, even if a extender pigment is contained in the aqueous phase, the impregnation speed of the ink and the drying property of the ink cannot be improved. As a result, the effect for preventing the offsetting of the ink is limited.

SUMMARY OF THE INVENTION

The object of the present invention is to provide an emulsion ink for stencil printing having solved the above-mentioned problems, which affords a printing image having a high density and a definite quality, without being influenced by the kinds of the printing paper used and the presence of the projections and depressions on the surface of the printing paper used, and also having a superior drying property of the ink and having no exudation, seeping-off and offsetting of the ink.

The present invention has the following aspects, (1) to (4):

(1) An emulsion ink for stencil printing, which comprises an oil phase and an aqueous phase to form a Water-in-oil (W/O) type emulsion ink, wherein an extender pigment is contained in the oil phase of the emulsion ink.

(2) An emulsion ink for stencil printing according to item (1), wherein the extender pigment is contained in a quantity of 1 to 50% by weight based upon the total weight of the emulsion ink.

(3) The emulsion ink according to item (1) or (2), wherein the extender pigment is at least one pigment selected from the group of calcium carbonate, titanium oxide and silica.

(4) An emulsion ink for stencil printing according to item (1) or item (2), wherein a coloring agent, a resin, a non-volatile solvent, a volatile solvent and an emulsifying agent are contained in the oil phase.

(5) An emulsion ink for stencil printing according to item (1) or item (2), wherein a resin, a non-volatile solvent, a volatile solvent and an emulsifying agent are contained in the oil phase, and a coloring agent and an oil-in-water (O/W) type resin emulsion and/or a water-soluble polymer are contained in the aqueous phase.

DETAILED DESCRIPTION OF THE INVENTION

In the present invention, since a extender pigment is contained in the oil phase component of the W/O type emulsion ink, when the emulsion ink is applied to a printing paper, it is possible to retain the coloring agent in the oil phase component or the coloring agent in the aqueous phase component together with the extender pigment on the surface of the printing paper used, with a good efficiency, whereby the reduction in the printing density is effectively prevented and the quantity of the coloring agent impregnated in the inside of the printing paper used is reduced to prevent the seeping-through of the ink.

Further, when the emulsion ink is applied to a printing paper, the liquid component in the oil phase component is instantaneously separated from the extender pigment and only the liquid component is impregnated into the inside of the paper; hence the impregnation speed of the oil phase component becomes large, resulting in the impregnation speed of the emulsion ink, too, becomes large, whereby the drying property is improved, and the offsetting is also improved.

Further, according to the ink of the present invention, the projections and the depressions on the surface of the paper used are levelled with the ink to reduce the projections and depressions on the surface, whereby printing of gloss tone is possible and even when full color printing is carried out, almost the same image is obtained indifferently to the kind of the paper used.

Further, the imparting of the viscosity to the ink for stencil printing is possible by selecting the kind of the extender pigment to be added; hence an ink suitable to stencil printing is obtained without reducing the impregnation speed of the ink, rather than imparting of the viscosity by using polymer compound such as resin component in the oil phase.

The W/O type emulsion ink in the present invention is prepared for example, by gradually adding 90 to 30% by weight of the aqueous phase (W) component to 10 to 70% by weight of the oil phase (O) component and emulsifying the mixture.

In the present invention, a extender pigment is contained in the oil phase component. This extender pigment is a colorless pigment and different from a coloring agent for coloration, and it has a function of preventing impregnation of coloring agent into the inside of the used paper at the time of impregnation of the ink component, thereby retaining it on the surface of the printing paper used.

As the extender pigment, if it is fine particles which are water-insoluble as well as oil-insoluble, there is no particular limitation, and for example, inorganic fine particles of china clay, talc, clay, diatomaceous earth, calcium carbonate, barium sulfate, titanium oxide, alumina white, silica, kaolin, mica, aluminum hydroxide, etc., organic fine particles such as polyacrylic acid esters, polyurethane, polyester, polyethylene, polypropylene, polyvinyl chloride, polyvinylidene chloride, polystyrene, polysiloxane, phenol resin, epoxy resins, benzoguanamine resin, etc. or fine particles of copolymers thereof, are used.

The quantity of the extender pigment added is preferred to be 1 to 50% by weight, and more preferred to be 5 to 20% by weight, based upon the total weight of the emulsion ink. If the quantity of the extender pigment is too small, the effect upon the printing density, the seeping-through, etc. of printed matter are reduced, whereas if it is too large, an ink unsuitable to stencil printing, that is, an ink which is difficult to be extruded from the perforating parts of stencil sheet, is obtained.

As to the particle diameter of the extender pigment, if it is to an extent of not collapsing the emulsion ink, there is no particular limitation thereto, but in order that the extender pigment in the oil phase component is liable to be retained on the surface of the paper together with the coloring agent, the particle diameter of the extender pigment is preferred to be made larger than the pore diameter on the surface of the paper used. If the particle diameter is smaller, the extender pigment is impregnated into the inside of the used paper along with other oil phase components, to reduce the effect of the addition of the extender pigment.

For example, when a high quality paper is used, it is preferred to use a extender pigment having a particle diameter of 2 to 3 μm or more. From a similar viewpoint, a coloring agent having a particle diameter larger than the pore diameter of the paper used, might be preferably used.

The oil phase component may contain a coloring agent, a resin, a non-volatile solvent, a volatile solvent and an emulsifying agent, together with a extender pigment, but when a coloring agent is contained in an aqueous phase component, it is possible to remove the coloring agent from the oil phase component.

As the coloring agent, known pigments can be used, for example, carbon blacks such as furnace carbon black, lamp black, acetylene black, channel black, etc., metallic pigments or metal oxides such as copper, iron, titanium oxide, calcium carbonate, etc., and organic pigments such as azo systems, cyanine systems, dioxazine systems, quinacridone systems, etc. are used.

As the resins contained in the oil phase component, those having functions of improving the dispersibility of the extender pigment and the coloring agent in the oil phase and tightly adhering them onto the printing paper used, for example, phenolic resins, maleinic resins, petroleum resins, alkyd resins, etc. can be used.

Further, as the non-volatile solvents, mineral oil systems such as motor oil, spindle oil, machine oil, fluid paraffin, etc. and plant oil systems such as olive oil, castor oil, salad oil, etc. can be used. Further, as the volatile solvents, known mineral oil solvents, plant oil solvents can be used. The proportion of these solvents used (non-volatile solvent/volatile solvent) varies depending upon the blending ratio of the oil phase to the aqueous phase, and a range of 50 to 95/50 to 5 is preferred.

The emulsifying agent is used for composing the W/O type emulsion and nonionic surfactants are preferably used. For example, sorbitan higher fatty acid esters such as sorbitan monolaurate, sorbitan monopalmitate, sorbitan monostearate, sorbitan tristearate, sorbitan monooleate, sorbitan sesquioleate, etc., fatty acid monoglyceride, fatty acid diglyceride, and ethylene oxide adducts of higher alcohols, alkylphenols, fatty acids, etc. are mentioned.

As to the aqueous component in the present invention, in the case where a coloring agent is contained in the aqueous component, in order to improve the dispersibility of the coloring agent and its adhesion onto paper, it is preferred to contain an O/W type resin emulsion and/or a water-soluble polymer compound therein. As the coloring agent, those used in the above oil phase component may be used.

As the O/W type resin emulsion, resin emulsions of polyvinyl acetate, ethylene-vinyl acetate copolymer, vinyl acetate-acrylic acid ester copolymer, polymethacrylic acid ester, polystyrene, styrene-acrylic acid ester copolymer, styrene-butadiene copolymer, vinylidene chloride-acrylic acid ester copolymer, polyvinyl chloride, vinylchloride-vinyl acetate copolymer, polyurethane, etc. can be used.

Further, as water-soluble polymer compounds, polyvinyl alcohol, methyl cellulose, carboxymethylcellulose, hydroxymethylcellulose, polyvinyl pyrrolidone, polyethylene-polyvinyl alcohol copolymer, polyethylene oxide, polyvinyl ether, polyacrylamide, acacia, starch, water-soluble urethane, etc. can be used.

The quantity of the resin component in the aqueous phase component is preferably 20% by weight or less, more preferably 10% by weight or less, as calculated in terms of solids, based upon the total quantity of the emulsion ink. If the quantity of the resin component added is too large, when the ink is placed on the stencil sheet and allowed to stand for a long time, the resin component may form a film at the perforated parts on the sheet, to inhibit the passage of the ink at the time of printing.

Further, in order to improve the wetness of the coloring agent, to water, its dispersibility therein, etc., a surfactant or the like may be contained in the aqueous phase component. Further, if necessary, a water-soluble additive such as wetting agent, electrolyte, fungiproof agent, antioxidant, agent for preventing water vaporization, etc. may be contained in the aqueous phase component.

EXAMPLE

The present invention will be described in more detail, but it should not be construed to be limited thereto. In addition, the parts in Examples means, part by weight.

Example 1

A (W/O) type emulsion ink was prepared by blending components shown in Table 1 according to the following method:

Firstly, an alkyd resin, furnace carbon black and sorbitan monooleate were sufficiently mixed, followed by sufficiently kneading the mixture by means of three-rolls calender. Calcium carbonate was added to No.6 solvent and sorbitan monooleate, sufficiently mixing the mixture, dispersing it by means of a ball mill (stainless balls) for 24 hours, adding the above obtained kneaded mixture to the resulting dispersion, adding #40 motor oil, sufficiently stirring the mixture, to obtain an oil phase. An aqueous solution consisting of water and ethylene glycol was gradually added to the oil phase, with stirring by means of a stirrer, to emulsify the mixture, thereby preparing a water-in-oil type emulsion.

In average particle diameters shown in Table 1 were measured by means of a centrifugal type, particle diameter-measuring device (CAPA-700, manufactured by Horiba Seisakusho Co. Ltd.).

Examples 2 and 3 and Comparative Example 1

Example 1 was repeated except that titanium oxide (in Example 2) and silica (in Example 3) in place of calcium carbonate were respectively used as a extender pigment, and no extender pigment was used in Comparative Example 1, to obtain the respective emulsion inks. As to titanium oxide and silica, those obtained by subjecting the surface to hydrophobic treatment were used.

Example 4

Example 1 was repeated except that the coloring agent in Example 1 was not used in the oil phase component, and the coloring agent, the dispersing agent, the O/W type emulsion, water and ethylene glycol having blending proportions shown in Table 1 were used as an aqueous phase component, to obtain an emulsion ink.

Comparative Example 2

Example 1 was repeated except that the coloring agent and the resin in Example 1 were not used in the oil phase component, and the coloring agent, the dispersing agent, the O/W type emulsion, water and ethylene glycol having proportions shown in Table 1 were used as an aqueous phase component, to obtain an emulsion ink.

TABLE 1

| | (Unit: part by weight) | | Ex. 1 | Ex. 2 | Ex. 3 | Ex. 4 | Com. ex. 1 | Com. ex. 2 |
|---|---|---|---|---|---|---|---|---|
| oil phase | Coloring agent | Furnace carbone black | 4.0 | 4.0 | 4.0 | — | 4.0 | — |
| | Resin | Alkyd resin | 8.0 | 8.0 | 8.0 | 7.0 | 11.0 | — |
| | Non-volatile solvent | #40 Motor oil | 3.0 | 3.0 | 3.0 | 3.0 | 5.0 | 15.0 |
| | Volatile solvent | No. 6 solvent | 8.0 | 8.0 | 8.0 | 8.0 | 11.0 | 8.0 |
| | Emulsifying agent | Sorbitane monooleate | 2.0 | 2.0 | 2.0 | 2.0 | 2.0 | 2.0 |
| | Extender pigment (Average particle diameter: μm) | $CaCO_3$ | 8.0(2.5) | — | — | 8.0(3.0) | — | — |
| | | $TiO_2$ | — | 8.0(3.0) | — | — | — | — |
| | | Silica | — | — | 8.0(2.0) | — | — | — |
| Aqueous phase | Water | Ion-exchange water | 61.0 | 61.0 | 61.0 | 51.0 | 61.0 | 64.0 |
| | Wetting agent | Ethylene glycol | 6.0 | 6.0 | 6.0 | 6.0 | 6.0 | 6.0 |
| | Dispersing agent | Polyvinyl pyrrolidone | — | — | — | 1.0 | — | 1.0 |
| | (O/W) emulsion | Acrylic acid ester | — | — | — | 10.0 | — | 10.0 |
| | Coloring agent | Furnace carbon black | — | — | — | 4.0 | — | 4.0 |

Using the respective emulsion inks for stencil printing, obtained in Example 1 to 4 and Comparative examples 1 and 2, stencil printing was carried out on a high quality paper, by means of a stencil printing devise (Risograph RC 115D (trade mark) manufactured by Riso Kagaku Corporation). Evaluation of the printed density, seeping-through, offsetting and exudation of the resulting printed matters, and the printed density obtained by carrying out printing on a low quality paper (regenerated paper) having projections and depressions on the surface, were examined according to the following methods, and the results are shown in Table 2:

(1) Printed density: The printed densitys of solid-printed part was measured by means of OD (optical density) meter (RD 920, manufactured by McBeth Co., Ltd.).

(2) Seeping-through: The density on the back surface side of the solid-printed part was measured by means of OD meter (ditto).

(3) Off-setting: After 100 sheets were continuously printed, the dirties on the reverse side of the printed surface were evaluated by naked eyes. The case where no off-setting occurred was designated by O, and the case where off-setting occurred was designated by X.

(4) Exudation: The exudation state at the part where the ink adhered was observed by means of a microscope (80 magnitude). The case where almost no exudation was observed was designated by O, and the case where the exudation was motable was designated by X.

(5) The printed density of low grade paper: Evaluation was carried out in the same manner as above.

TABLE 2

|  | Ex. 1 | Ex. 2 | Ex. 3 | Ex. 4 | Com. ex. 1 | Com. ex. 2 |
|---|---|---|---|---|---|---|
| Printed density | 1.28 | 1.21 | 1.25 | 1.23 | 0.96 | 1.18 |
| Seeping-through | 0.13 | 0.14 | 0.13 | 0.15 | 0.30 | 0.21 |
| Offsetting | O | O | O | O | X | X |
| Exudation | O | O | O | O | X | X |
| Printed density of low grade paper | 1.20 | 1.22 | 1.20 | 1.19 | 0.85 | 1.01 |

From Table 2 it was found that in the cases of Examples 1 to 4, as compared with the cases of Comparative Examples 1 and 2, the printed density was higher, the seeping-through and the exudation were superior, and even when printing was carried out on low grade paper, the printed density became higher. Further, the offsetting designating the impregnation speed of ink, too, could be reduced.

According to the emulsion for stencil printing of the present invention, since the extender pigment is contained in the oil phase, the printed density is higher, and the ink-drying speed can be increased, without causing seeping-through, exudation, etc. of ink.

What we claim is:

1. A water-in-oil emulsion ink for stencil printing, which comprises an oil phase and an aqueous phase, wherein an extender pigment, a coloring agent, a resin, a non-volatile solvent, a mineral oil solvent or a plant oil solvent and an emulsifying agent are contained in the oil phase of the emulsion ink.

2. An emulsion ink for stencil printing according to claim 1, wherein the extender pigment is contained in a quantity of 1 to 50% by weight based upon the total weight of the emulsion ink.

3. The emulsion ink according to claim 1 wherein the extender pigment is selected from the group consisting of calcium carbonate, titanium oxide, silica and mixtures thereof.

4. An emulsion ink for stencil printing according to claim 1, wherein a coloring agent, a resin, a non-volatile solvent, a volatile solvent and an emulsifying agent are contained in the oil phase.

5. A water-in-oil emulsion ink for stencil printing which comprises an oil phase and an aqueous phase, an extender pigment, a resin, a non-volatile solvent, a mineral oil solvent or a plant oil solvent and an emulsifying agent contained in the oil phase, and a coloring agent and an oil-in-water resin emulsion, a water-soluble polymer or mixtures thereof contained in the aqueous phase.

6. The emulsion ink according to claim 2, wherein the extender pigment is at least one pigment selected from the group consisting of calcium carbonate, titanium oxide, silica and mixtures thereof.

7. An emulsion ink for stencil printing according to claim 2 wherein, a coloring agent, a resin, a non-volatile solvent, a volatile solvent and an emulsifying agent are contained in the oil phase.

8. An emulsion ink for stencil printing according to claim 2 wherein, a resin, a non-volatile solvent, a volatile solvent, and an emulsifying agent are contained in the oil phase, and a coloring agent and an oil-in-water resin emulsion a water-soluble polymer or mixtures thereof are contained in the aqueous phase.

9. An emulsion ink for stencil printing according to claim 5, wherein the extender pigment is contained in a quantity of 1 to 50% by weight based upon the total weight of the emulsion ink.

10. The emulsion ink according to claim 5, wherein the extender pigment is at least one pigment selected from the group consisting of calcium carbonate, titanium oxide and silica.

* * * * *